Feb. 12, 1946. R. G. LE TOURNEAU 2,394,861
AUTOMATIC CHUCK
Filed Aug. 11, 1943 3 Sheets-Sheet 1

Inventor
R. G. LeTourneau

Feb. 12, 1946.    R. G. LE TOURNEAU    2,394,861
AUTOMATIC CHUCK
Filed Aug. 11, 1943    3 Sheets-Sheet 2

Inventor
R. G. LeTourneau
By
Attorneys

Fig. 5

Patented Feb. 12, 1946

2,394,861

UNITED STATES PATENT OFFICE 2,394,861

AUTOMATIC CHUCK

Robert G. Le Tourneau, Peoria, Ill., assignor to R. G. Le Tourneau, Inc., Stockton, Calif., a corporation of California Application August 11, 1943, Serial No. 498,193

7 Claims. (Cl. 82—42)

This invention relates in general to an improved work driving chuck for lathes wherein the work is otherwise supported and centered, and in particular the invention is directed to, and it is an object to provide, a chuck of the type described which includes eccentrically mounted work engaging and driving jaws which are responsive to resistance of the work to turning whereby said jaws, when in working position, automatically grip and rotate the work.

Another object of the invention is to provide a work driving chuck, as above, in which each jaw is associated with means which urges the jaw into initial engagement with the work when the jaw is set in one position, and holds the jaw clear of the work when said jaw is set in another position; the setting of the jaws in said positions being accomplished selectively, easily and quickly by hand.

An additional object of the invention is to provide an automatic chuck which includes a driving head, a plurality of eccentric work engaging and driving jaws, jaw supporting pins pivotally securing said jaws to the driving head for turning movement about an axis parallel to the lathe axis, and spring means mounted between each jaw and pin operative to exert a limited turning movement to the jaw in a work engaging direction; said pins being normally non-rotatable but are mounted for relative rotative adjustment so that the limits, circumferentially, of such turning movement of the jaws can be altered whereby the chuck is adjustable, within the range of the eccentric jaws, to work of different diameters.

A further object of the invention is to provide, as a modification, an automatic chuck having eccentric work engaging and driving jaws, said jaws each being supported by a pin whose shank extends in secured relation through a matching bore in a driving head or face plate; said driving head having a series of radially spaced bores corresponding to each pin, and corresponding bores in the different series being in the same circumferential plane, whereby the jaws can be mounted different but equal distances from the axis of the lathe, as necessitated by the diameter of the work and centered therein. This manner of adjustment can be employed when adjustment within the range of the jaws, as in the preceding paragraph, is not sufficient.

A further object of the invention is to provide a simple and inexpensive device, and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 5 is a face view of a modified form of chuck in working position, with one jaw in section.

Figure 1:
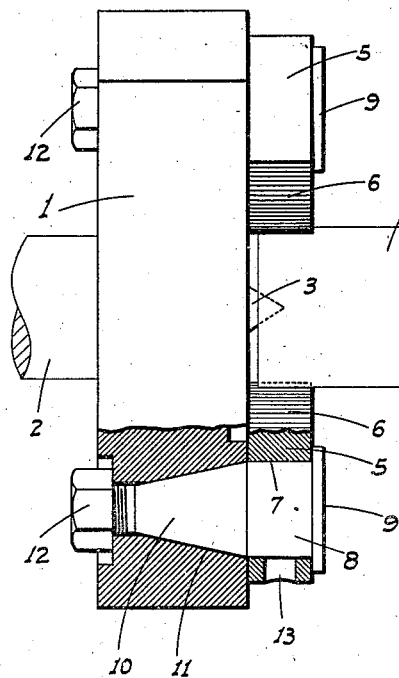
Figure 1 is a face view of the chuck in work engaging position, one jaw unit being shown in section.
Figure 2:
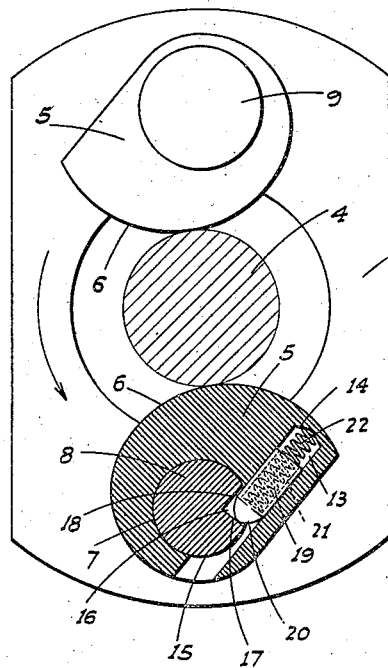
Figure 2 is a side elevation, partly in section, of the chuck in work engaging position.
Figure 3:
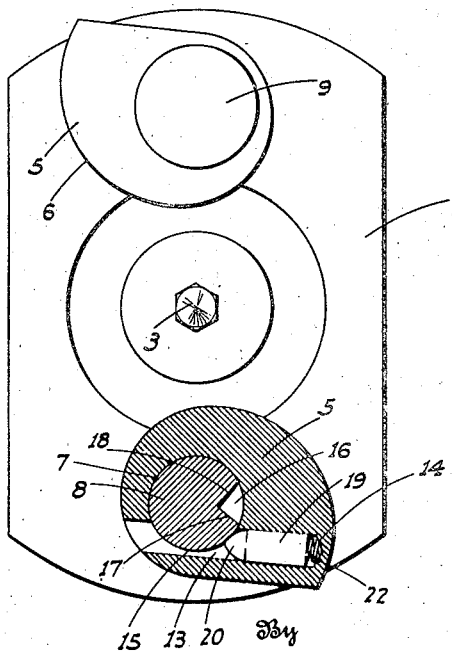
Figure 3 is a face view of the chuck as released, one jaw unit being shown in section.

Referring now more particularly to the characters of reference on the drawings, and at present to Figs. 1–3, inclusive, the numeral 1 indicates a face plate or driving head adapted to be secured centrally to the driven spindle 2 of a lathe; there being a center pin 3 projecting axially from the driving head. The work to be machined, indicated at 4, is disposed in the lathe with center pin 3 supporting and centering one end of said work.

A plurality of jaw units, here shown as two, are mounted in connection with driving head 1 on opposite sides of the axis of the lathe and for simultaneous driving engagement with the work 4; each such jaw unit being constructed and operating as follows:

An eccentric jaw 5 having a relatively wide work engaging face 6, which is knurled or serrated, and of increasing eccentricity in a clockwise direction, is formed with an off-center bore 7 through which a supporting pin 8 projects with a relatively close running fit; the outer end of said pin having an enlarged head 9 while the shank 10 of said pin is tapered toward its free end and seats in a matching bore 11 in the driving head 1. The rear end of this pin has a nut 12 threaded thereon, said nut seating against the back of the driving head and normally drawing the taper shank tight into the matching bore 11, preventing rotation of the pin. When the shank is drawn tight, enough clearance exists between the face of the driving head 1 and pin head 9 to permit of relative rotation of jaw 5.

The jaw is formed with a straight, elongated bore 13 which extends transversely of the jaw axis into the jaw from a point on its circumference and on the side of pin 8 generally opposite the work 4; the center line of this bore being substantially tangential to said side of pin 8. The bore 13 extends into the jaw some distance beyond pin 8 and terminates at a closed end which forms a seat 14. By forming and positioning the bore 13, as above, a portion 15 of pin 8 projects into or intersects the bore intermediate the ends of the latter.

The portion 15 of pin 8 is formed with a right-angle notch 16 having one end wall 17, which faces transversely of the pin, disposed parallel to a line radially thereof. The notch is of such depth that when the jaw and pin are in such relative positions that wall 17 is disposed substantially at right angles in bore 13, the other wall 18 is parallel and substantially flush with the corresponding side of said bore.

The wall 18 of each notch serves as a stop against which the side of the corresponding plunger may engage to limit rotative movement of the jaw beyond a given point in a counter-clockwise direction.

A plunger 19 is slidably disposed in bore 13 between the portion 15 of pin 8 and seat 14; the end 20 of the plunger adjacent the pin being rounded, while a socket 21 in said plunger opens to the opposite end thereof. A loaded compression spring 22 is disposed in the socket and extends between the plunger and seat 14, urging said plunger toward the pin.

Operation

In use, the above described automatic chuck functions as follows:

At the outset the jaws 5 are in such rotative position on the pins that the eccentric faces 6 of the jaws are clear of the work 4, which can therefore be readily centered in the lathe without obstruction by the jaws. Each of the jaws is held clear of the work by the frictional engagement of its plunger 19 with the circumference of portion 15 of the corresponding pin 8 at a point adjacent but ahead of notch 16.

After the work 4 has been centered in the lathe, the operator grasps the jaws 5 and rotates the same in a counter-clockwise direction until the plungers snap into the notches 16. Thereafter the spring pressed plungers engage walls 17 of corresponding notches 16, which urges the jaws in a counter-clockwise direction and into firm frictional engagement with the work.

When the lathe is started the resistance of the work to turning causes the eccentric jaws to automatically grip the work and to rotate the latter with the driving head 1. After the machining operation, the operator merely swings the jaws clockwise until plungers 19 snap out of notches 16 and return to their initial angle and in which the jaws are clear of the work.

The clutch is easily adjustable to work of different diameters within the range of jaws 5, by merely loosening, rotatively adjusting, and retightening the pins 8; such adjustment varying the circumferential position of notches and consequently the corresponding position of the plunger pressed jaws. By such adjustment the angle of bite of the jaws can be maintained substantially the same for different diameter work.

Figure 4:
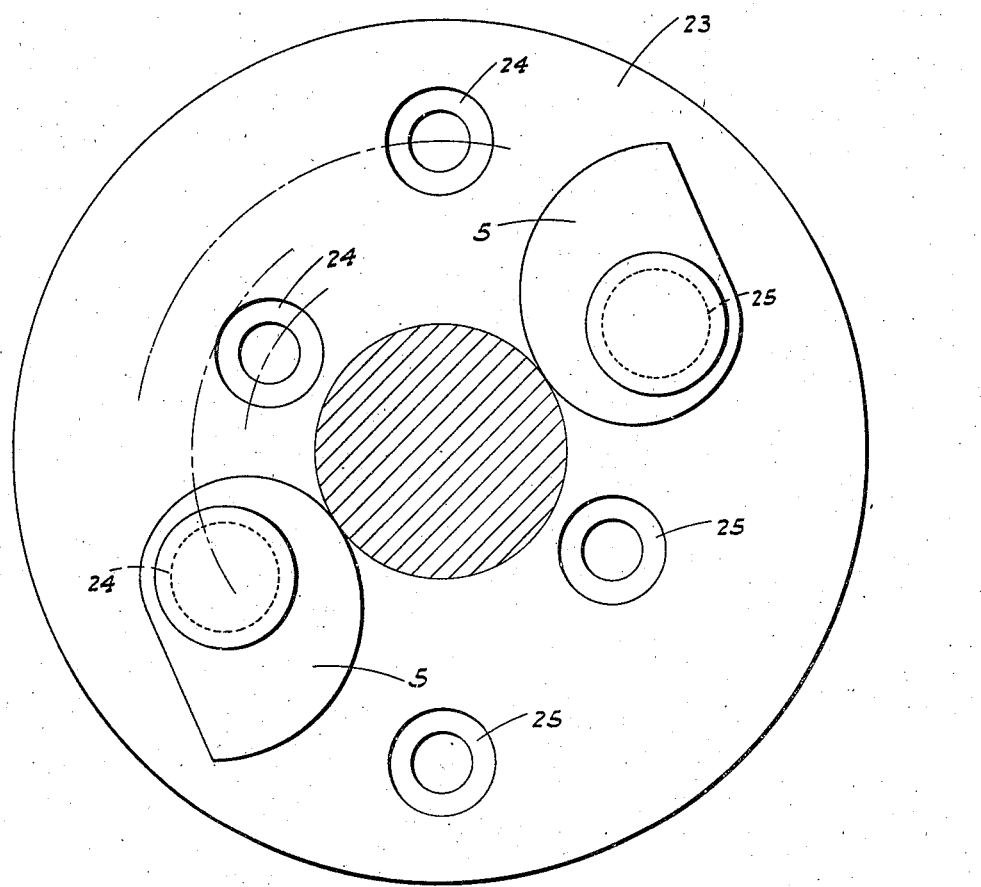
Figure 4 is a face view of a modification wherein the jaw units are adjustable radially of the chuck.

If the work is of varying diameters beyond the range of adjustment of the jaw, a chuck as shown in Fig. 4 may be employed.

In this embodiment the driving head 23 is formed with a series of pin receiving bores corresponding to each jaw unit; one series being indicated generally at 24, and the other at 25. The bores of each series are disposed in different circumferential paths, with corresponding bores of the different series in the same circumferential path. The pins of the jaw units, which latter are constructed as hereinbefore described, are mounted in such corresponding bores of the different series as properly position the jaws for driving engagement with the work.

Figure 5:
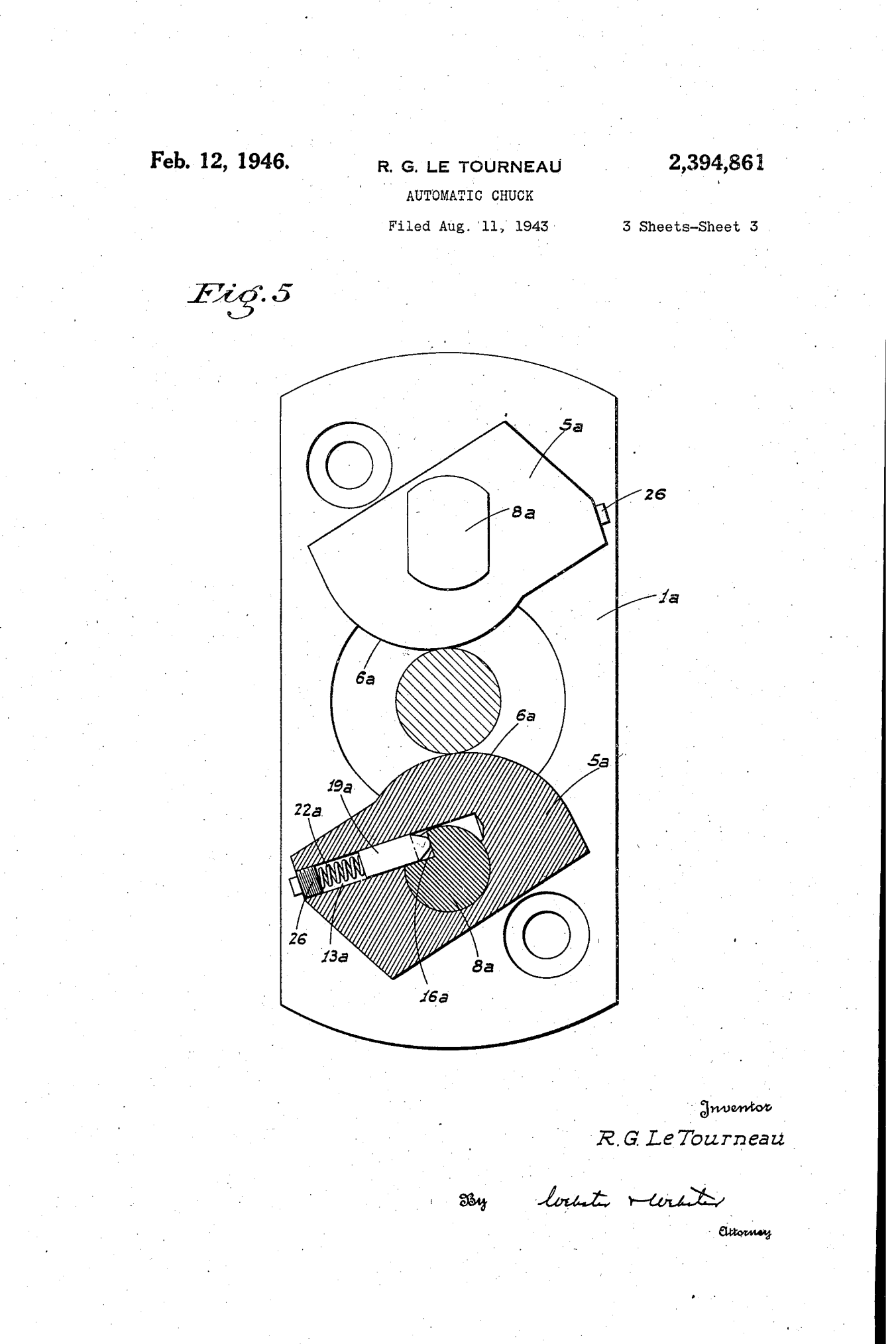

In the embodiment of Fig. 5, the driving head 1a is substantially of the same form as that shown in Fig. 1, and has a pair of opposed jaw supporting pins 8a mounted therein. The jaws or dogs 5a are turnably mounted on these pins and have eccentric work engaging faces 6a. A plunger 19a is slidably mounted in a bore 13a in the jaw and normally engages a notch 16a in the pin 8a, as in the first described type. The bore, however, is open at its ends nearest the outer end of the pin and the plunger-spring 22a in said bore is held in place by a screw plug 26 in said end of the bore. This arrangement facilitates initial placing of the plunger and spring in associated relation with the pin, as will be obvious.

Another feature of this form of chuck is that the weight distribution of each jaw or dog relative to its center of rotation (pin 8a), is such that centrifugal force facilitates engagement of the jaw with the work when the chuck is in operation.

The herein described chuck, in any embodiment, materially expedites machining operations, as the jaw units are entirely clear when the work is being placed in or removed from the lathe, and when the work is in place the jaws are readily movable by hand into or out of work engaging position.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A lathe chuck comprising a driving head having work supporting and centering means thereon, an eccentric jaw pivoted on the head for movement transversely of and into engagement with the work, and spring actuated means operative when the jaw is in one position to hold said jaw clear of the work, the same spring actuated means being operative when the jaw is in another position to urge the jaw into engagement with the work; the eccentricity of said jaw increasing in a direction contra to the direction of rotation of the driving head, said spring actuated means including a spring pressed plunger mounted in connection with the jaw for sliding movement, the jaw being pivotally supported by a notched pin, and the plunger engaging the circumference of the pin when the jaw is in said one position and engaging one wall of the notch when the jaw is in said other position.

2. A lathe chuck comprising a driving head having work supporting and centering means thereon, an eccentric jaw, a pin projecting from the head and on which said jaw is pivoted for movement transversely of and into engagement with the work, the eccentricity of the work engaging face of the jaw increasing in a direction contra to the direction of rotation of said head, the portion of the pin in the jaw being notched lengthwise and the jaw having a bore therein open at one end to the pin in the circumferential plane of the notch, and a spring pressed plunger in said bore adapted to engage one wall of the notch and to then urge the jaw in the direction of and into engagement with the work.

3. A chuck as in claim 2 in which the pin is mounted on the driving head in normally fixed but rotatively adjustable relation.

4. A lathe chuck comprising a driving head having work supporting and centering means thereon, an eccentric jaw, a pin projecting from the head and on which said jaw is pivoted for movement transversely of and into engagement with the work, the eccentricity of the work engaging face of the jaw increasing in a direction contra to the direction of rotation of said head, the portion of the pin in the jaw being notched lengthwise and the jaw having a bore therein open at one end to the pin in the circumferential plane of the notch, and a spring pressed plunger in said bore; said plunger being adapted to engage the circumference of the pin ahead of the notch when the jaw is clear of the work whereby to hold the jaw in said position, or to engage in the notch against one wall thereof whereby to then urge the jaw in the direction of and into engagement with the work.

5. A chuck as in claim 4 in which the longitudinal center line of said bore in the jaw is substantially tangent to the pin; said one wall of the notch being substantially parallel to a line radially of the pin.

6. A lathe chuck comprising a driving head having work supporting and centering means thereon, an eccentric jaw, a pin projecting from the head and on which said jaw is pivoted for movement transversely of and into engagement with the work, the eccentricity of the work engaging face of the jaw increasing in a direction contra to the direction of rotation of said head, the jaw having a bore therein transversely of the pin and on the side thereof generally opposite the work, said bore being closed at one end and a portion of the pin extending across said bore, a right angle notch formed lengthwise in the pin at a point so that said notch is exposed in the bore when the jaw is in a predetermined position, the notch having a wall facing generally in the direction in which the jaw moves toward the work, and a spring pressed plunger disposed in the bore between the closed end thereof and the pin, said plunger being adapted to engage said wall and urge the jaw toward the work, or to engage the pin clear of the notch and hold the jaw stationary away from the work.

7. A lathe comprising a driving head, work supporting means on the head comprising an eccentric jaw unit which includes a pin projecting from the head, a jaw turnably mounted on the pin for movement transversely of and into and out of engagement with the work, a spring pressed plunger contained within the jaw, such plunger being operable to engage the pin and hold the jaw in engagement with the work when the jaw is in one position and to engage the pin and hold the jaw out of engagement with the work when the jaw is in another position.

ROBERT G. LE TOURNEAU.